3,100,184
TRITIUM PRODUCTION BY NEUTRON-IRRADIATION OF ALUMINUM-LITHIUM ALLOYS

Bernard M. Abraham, Chicago, Ill., assignor to the United States of America as represented by the United States Atomic Energy Commission
No Drawing. Filed Sept. 24, 1951, Ser. No. 248,105
12 Claims. (Cl. 204—154.2)

This invention deals with the production of tritium by neutron-irradiation of lithium, and in particular of the lithium isotope having a mass number of 6. Natural lithium contains 7.35% of the $Li^6$ isotope. Tritium is the hydrogen isotope having a mass number of 3; it is radioactive and therefore valuable as a tracer in the study of reactions involving hydrogen.

When $Li^6$ is bombarded with neutrons, tritium is mainly formed according to the following equation:

$$_3Li^6 + _0n^1 \rightarrow _1H^3 + _2He^4$$

Two volumes of helium are formed for each volume of tritium, according to this equation, on account of the diatomic nature of the tritium molecule.

Some of the tritium formed decays according to the following equation:

$$_1H^3 \rightarrow \beta + _2He^3$$

However, the helium molecule formed absorbs one neutron whereby the tritium molecule is restored and hydrogen having a mass number of 1 and often called protium is also formed:

$$_2He^3 + _0n^1 \rightarrow _1H^1 + _1H^3$$

These two side reactions account for the hydrogen gas usually associated with the tritium produced by neutron bombardment of lithium.

Lithium, for the purpose of the production of tritium, has been used heretofore in the form of slugs of compressed lithium fluoride powder; after irradiation, the slugs were dissolved in water for the purpose of releasing and recovering the tritium. Those lithium fluoride slugs, however, were found to have certain disadvantages, the main handicap being that they rupture under the influence of irradiation so that their service life is very limited.

It is an object of this invention to produce tritium from lithium-containing bodies, e.g. slugs, which retain their shape during irradiation and which in particular do not swell or rupture.

It is also an object of this invention to produce tritium from lithium-containing bodies which can be irradiated for a considerably longer period of time and at a higher flux density then has been possible with the lithium fluoride bodies used heretofore.

It is another object of this invention to provide a process of producing tritium by which the tritium is obtained in a relatively pure and concentrated form.

These and other objects are accomplished by preparing an aluminum-lithium alloy body, e.g. in the form of a slug, inserting said body into a neutronic reactor wherein it is exposed to neutron-irradiation, heating the irradiated body whereby the tritium formed is released, and collecting the tritium emitted. The neutron-irradiation in neutronic reactors amounts to about at least $1 \times 10^{10}$ neutrons/second/gram of lithium.

While the lithium content of the alloy is not critical as far as the tritium formation is concerned, a range up to 25% proved suitable; however, it has been found advantageous for the sake of purity of the final product to restrict the lithium content to a maximum amount of 4%. With such relatively low lithium contents all of the lithium is contained in one phase as a true alloy with aluminum, while with higher lithium contents the excess lithium forms a separate metallic lithium phase; this lithium, being hygroscopic, may cause a high hydrogen content in the alloy bodies which later on would considerably dilute and contaminate the tritium formed.

For the same reason, namely, that of reducing the hydrogen content of the aluminum-lithium alloy, it has been found advantageous to make the alloy article by casting it in vacuum. The body is preferably canned or jacketed prior to irradiation which may be done by casting the alloy directly into the can. Aluminum cans have been found suitable.

After neutron-bombardment the aluminum-lithium bodies, after decanning, are first heated to a relatively low temperature, they are "outgassed," in order to remove any contaminating gases absorbed on the surface. This is done by placing the body in a furnace, preferably evacuating the furnace, and heating the slug to about 375° to 470° C. A temperature of from 430° to 440° C. was found best, and a vacuum, for instance of about $10^{-4}$ mm. mercury, proved very satisfactory. Under these conditions, the loss of tritium was less than 5%; the use of higher outgassing temperatures increased the tritium loss to a degree which impaired the economy of the process, while with lower temperatures than those mentioned above outgassing was inefficient. For outgassing purposes, the body was preferably enclosed in a stainless steel tube which was made the heated section of the furnace. In order to assure a uniform temperature throughout the slugs and avoid overheating at some sections thereof which would cause a more or less great loss of tritium, it has been found advantageous to insert the furnace tube into a nickel-plated copper sleeve of about 0.25-inch thickness. The outgas is separately collected and processed for recovery of a small amount of tritium contained therein; this may be done by the method described below in connection with the isolation of tritium from the product gas.

After decontamination of the surface by outgassing, the tritium recovery proper, or "extraction," is effected. For this purpose, the alloy is heated uniformly until melted. While any suitable apparatus may be used for this step, a stainless steel tube, as used for outgassing, was found satisfactory. The tube used in the experiments described below had a capacity for three slugs; it also was made, like in the outgassing step, the heated section of a vacuum furnace. The steel tube had to be discarded after each use because it had become contaminated with radioactive tritium and because hygroscopic lithium had condensed at its sidewalls.

When heating the slugs for the tritium extraction step, it proved advisable first, i.e., until the alloy was melted, to let the gas pressure build up, for instance to about 600 mm. mercury whereby the size of bubbles is reduced and splashing of the melting metal against parts of the furnace is prevented. While considerable quantities of tritium, together with helium and other gaseous contaminants or diluents, are set free before the alloy has melted, the bulk is released after liquefaction. Once the alloy is in liquid condition, the pressure in the furnace is gradually reduced, for instance to about from $10^{-2}$ to $10^{-5}$ mm. mercury. The temperature is allowed to rise to about 700° C.

The melting point of the alloy, of course, is dependent upon the lithium content and can be found in handbooks, for instance in "Metals Handbook," published by The American Society for Metals, 1948 edition, page 1162. It was found, however, that irradiation somewhat lowered the melting point of the alloy; for instance, while an aluminum alloy having 4.8% of lithium melts between 625° and 635° C. when not irradiated, the same alloy but irradiated with 673 megawatt days melts between 611 and 621° C.

Instead of melting the alloy for the tritium recovery, heating to and maintaining a temperature of below the melting point was also investigated because it was considered possible then to re-use the slugs or other bodies after tritium volatilization. It was found that tritium actually can be recovered without melting the alloy although considerably more time is required in order to obtain the same result as by melting. For instance, in order to expel about 90% of the total gas contained in the slug, a heating time of two and one-half hours (at a furnace temperature of 615° C. which corresponds to about 525° C. for the slug temperature) was necessary, while the same result was accomplished in one-half hour when the alloy was melted. However, there is one feature which makes the tritium recovery from unmelted bodies unattractive, namely, the fact that the alloy bodies expand considerably during tritium evolution; this dimensional growth would make resizing of the slugs necessary prior to their re-use, a step which is very hazardous due to the radio-activity of the slugs.

The gas released during the extraction step just described may contain small amounts of oxygen and nitrogen and always contains relatively great amounts of helium and hydrogen. In order to free the tritium from these contaminating and diluting gases, according to the process of this invention, the mixture is first passed over uranium, which, for instance, is in the form of turnings, at a temperature of about 800° C. whereby nitrogen and oxygen are removed. Thereafter the remaining gas mixture is separated by a palladium valve having a temperature of from 350° to 400° C. whereby the hydrogen isotopes are adsorbed and diffuse through the palladium while the helium remains unadsorbed. During this step, a vacuum is maintained at the outlet side of the palladium valve so that back-diffusion of the tritium into the valve is prevented. This may be done by pumping the tritium-containing gas, e.g. into a product gas measuring system. The product gas consists essentially of tritium and hydrogen, the latter mainly formed by the side reactions discussed in the introductory part of this specification. Hydrogen and tritium finally may be separated, if desired; this is preferably done by a thermal diffusion separation method.

The tritium yield was found to be directly proportional to the irradiation time. In order to determine the yield, without separating the hydrogen from the tritium, the volume of the tritium-hydrogen mixture is measured and the tritium content thereof then ascertained by measuring the radioactivity of the gas in an ion chamber.

In the following examples, the process of this invention is illustrated without the intention to limit the invention to the details given therein.

EXAMPLE I

Twelve slugs, each consisting of about 160 g. of an aluminum-lithium alloy having a lithium content of 3.5% and each slug having a length of 3" and a diameter of 1.3", were irradiated for twenty actual days with about $1.6 \times 10^{12}$ neutrons/second/gram of lithium. Processing of the slugs was carried out in five runs. The slugs were first outgassed at a temperature of between 375° and 470° C. for from one and one-half to two and seven-tenths hours. The total hydrogen content of the irradiated slugs ranged from 4.9 to 6.1 cc. per slug (reduced to standard pressure and temperature) all of which but 1.0–1.6 cc. could be removed by outgassing. About 15% of the tritium formed was contained in the outgas. The yields for each run of final product gas, obtained by melting the slugs, are compiled in the following Table I.

Table I

| Run | Number of slugs in run | Total volume of product gas, cc. at STP | Percent tritium (found by spectrographic analysis) | Volume of 100% $T_2$ (cc. at STP) | |
|---|---|---|---|---|---|
| | | | | Per slug | Per g. of alloy |
| 1 | 3 | 14.8 | 67 | 3.3 | 0.022 |
| 2 | 1 | 6.0 | 52 | 3.1 | 0.020 |
| 3 | 2 | 9.0 | 73 | 3.3 | 0.021 |
| 4 | 3 | 14.6 | 77 | 3.7 | 0.024 |
| 5 | 3 | 18.1 | 48 | 2.9 | 0.018 |

The uniformity of tritium yields from the one-, two- and three-slug runs (runs 1, 2 and 3) indicates that, over the depth range thereby provided, the depth of molten alloy in the furnace has little or no effect on the tritium yield. This evidence is supported by the fact that in run 5 agitation of the molten alloy for about five minutes, after tritium was no longer evolved from the nonagitated melt, produced no further tritium evolution. The melt was agitated magnetically using a perforated stainless steel plate attached to a stainless steel rod. A short segment of black iron welded to the unattached end of the steel rod extended into the glass vacuum system so that the agitator could be moved up and down by a magnet acting through the glass walls.

The lower purity obtained in run 2 (52%) was caused by inadequate removal of the surface gases from the slugs and furnace walls by outgassing. A possible explanation for the low purity of run 5 (48%) is that absorption or adsorption of tritium and hydrogen by the black iron segment of the agitator may have occurred, thereby causing both a low tritium yield and a low tritium purity.

EXAMPLE II

Slugs consisting of the same alloy as that of the slugs used in Example I were irradiated for two and one-half months again with about $1.6 \times 10^{12}$ neutrons/second. The slugs were outgassed under high vacuum at about 435° C. (slug temperature) and then melted and heated under vacuum. After passing the product gas over heated palladium to separate the hydrogen isotopes from the helium, the yield of 21.5 cc. of a tritium gas per slug (at standard temperature and pressure) was ascertained; this tritium gas had a purity of 91–92%, the contaminant being hydrogen.

EXAMPLE III

In this experiment, which consisted of two separate runs, the relative rates of the release of hydrogen, helium and tritium from irradiated slugs, when heated without melting, were determined. Apart from the fact that the extraction temperatures were kept below the melting point of the alloy, the conditions used were similar to those prevailing in the previous examples. The outgas was collected separately, and the product gas was collected in two fractions (A and B) in each run. The hydrogen content of the product gas was considerably higher in the experiments of this example than the quantity usually present (10.3 and 25.7 cc., respectively, as compared with 6 cc. normally encountered) which probably was due to machining operations performed on the irradiated slugs prior to the tritium volatilization and/or to the use of ceramic thermocouple insulators which had not been degassed. The results of these tests are given in Table II.

*Table II*

| Run No. | Fraction | Maximum slug temp., °C. | Total gas, cc. (STP) | Hydrogen cc. (STP) | Tritium, cc. (STP) | Helium and other gases, cc. (STP) |
|---|---|---|---|---|---|---|
| 1 | Outgas | 343 | 3.6 | 1.5 | 0.03 | 2.1 |
|   | A | 498 | 11.6 | 3.0 | 6.2 | 2.4 |
|   | B | 589 | 102.7 | 5.8 | 55.6 | 41.3 |
|   | Total | | 117.9 | 10.3 | 61.83 | 45.8 |
| 2 | Outgas | 435 | 3.8 | 2.1 | 0.6 | 1.1 |
|   | A | 590 | 83.6 | 20.5 | 42.1 | 21.0 |
|   | B | 612 | 104.6 | 3.1 | 10.0 | 91.5 |
|   | Total | | 192.0 | 25.7 | 52.7 | 113.6 |

The gross yields of tritium (61.8 and 52.7 cc.) were about 89 and 76%, respectively, of the estimated recoverable amount of tritium. It will be noted that helium is evolved with greater difficulty than tritium; whereas the theoretical ratio of helium to tritium is 2.0, this ratio was 0.4 and 0.5 in the A fractions and 0.7 and 9.2 for the B fractions, respectively. This behavior may be utilized for enriching tritium by fractional volatilization. It is also obvious from the table that a temperature of 498° C. (run 1, fraction A) is not sufficiently high for tritium extraction but that about 590° C. is satisfactory.

It will be understood that the invention is not limited to the specific details given in the specification but that it can be modified within the scope of the appended claims.

What is claimed is:

1. A method of preparing tritium in a relatively pure state, which comprises irradiating an aluminum-lithium alloy with neutrons, heating the irradiated alloy whereby the tritium formed is released from the alloy and collecting the tritium emitted.

2. A method of preparing tritium in a relatively pure state, which comprises irradiating an aluminum-lithium alloy with neutrons, heating the irradiated alloy to a temperature between 375° and 470° C. whereby contaminating gases absorbed on the surface of the alloy are released, collecting said surface gases, and then increasing the temperature whereby a tritium-rich gas is emitted.

3. The process of claim 2 wherein the surface gases are removed by heating the alloy to a temperature of 430° to 440° C. at a reduced pressure.

4. The process of claim 2 wherein the pressure is reduced during heating for the removal of surface gases, then allowed to build up, while the temperature is increased and finally reduced while the increased temperature is maintained.

5. The process of claim 2 wherein the tritium-rich gas is expelled by heating the alloy to a temperature above the melting point.

6. The process of claim 2 wherein the tritium-rich gas is expelled by heating the alloy to a temperature of from 470° C. to below the melting point of the alloy.

7. The process of claim 2 wherein the expelled tritium-rich gas containing nitrogen, oxygen, helium and protium is decontaminated by passing it over heated uranium whereby nitrogen and oxygen are removed, then passing the remaining gas over heated palladium whereby tritium and protium are adsorbed by and diffuse through the palladium whereby these gases are separated from the helium, and finally separating the tritium from the protium by a thermal diffusion separation method.

8. The process of claim 7 wherein the uranium has a temperature of approximately 800° C. and the palladium has a temperature of about from 350° to 400° C.

9. The process of claim 1 wherein the alloy has a maximum lithium content of 4% by weight.

10. The process of claim 2 wherein the alloy has a maximum lithium content of 4% by weight.

11. The process of claim 2 wherein the neutron flux for irradiation of the lithium is at least $1 \times 10^{10}$ neutrons/second/gram of lithium.

12. The process of claim 11 wherein the neutron flux is about $1.6 \times 10^{12}$ neutrons/second/gram of lithium.

No references cited.